United States Patent [19]
Francis et al.

[11] 3,745,703
[45] July 17, 1973

[54] VEHICLE WINDOW REGULATOR MECHANISM

[75] Inventors: Reid E. Francis, Dearborn, Mich.; Anthony T. Marcuzzi, Windsor, Ontario, Canada

[73] Assignee: Ford Motor Company, Dearborn, Mich.

[22] Filed: Nov. 8, 1971

[21] Appl. No.: 196,376

[52] U.S. Cl............................ 49/103, 49/227, 49/351
[51] Int. Cl................................................. E05f 5/12
[58] Field of Search...................... 49/103, 227, 348, 49/350, 351, 353

[56] References Cited
UNITED STATES PATENTS
3,670,454   6/1972   Gebhard et al.................. 49/103
2,152,055   3/1939   Kegler............................... 49/103

*Primary Examiner*—Kenneth Downey
*Attorney*—Keith L. Zerschling and John J. Roethel

[57] ABSTRACT

A vehicle window system for raising and lowering in a window opening in a vehicle body structure a window panel vertically divided into coplanar ventilation and visibility sections. The system includes a window regulator mechanism comprising a first regulator arm coupled to the ventilation system and a second regulator arm coupled to the visibility section. The regulator arms also are coupled to the window regulator mechanism gear sector through respective pairs of followers and cam slots. The respective followers and cam slots are programmed so that upon rotation of the gear sector in window opening direction the ventilation section is first lowered to a predetermined position before the visibility section starts to open and upon rotation of the gear sector in window closing direction the visibility section reaches a fully raised position before the ventilation section starts to rise.

5 Claims, 3 Drawing Figures

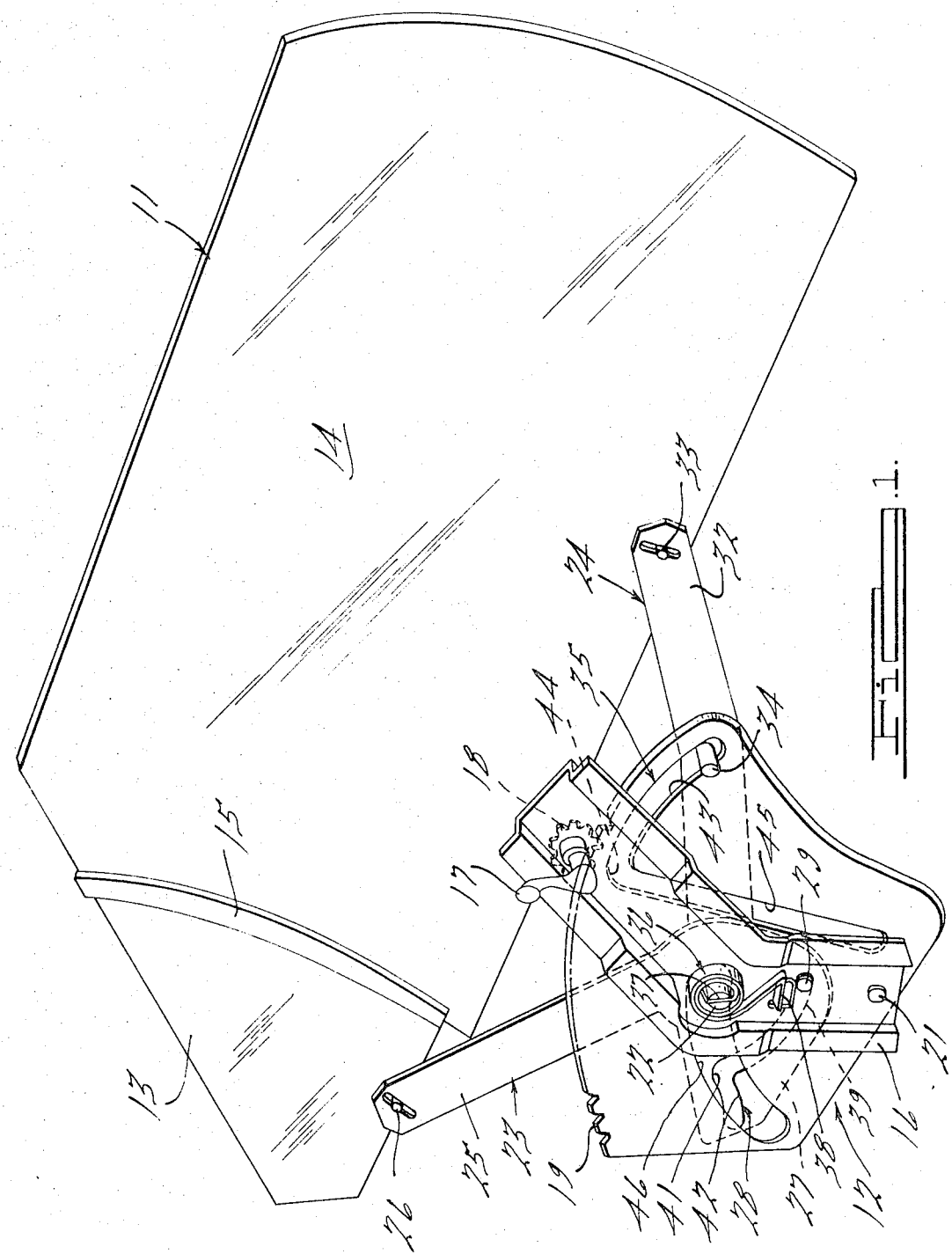

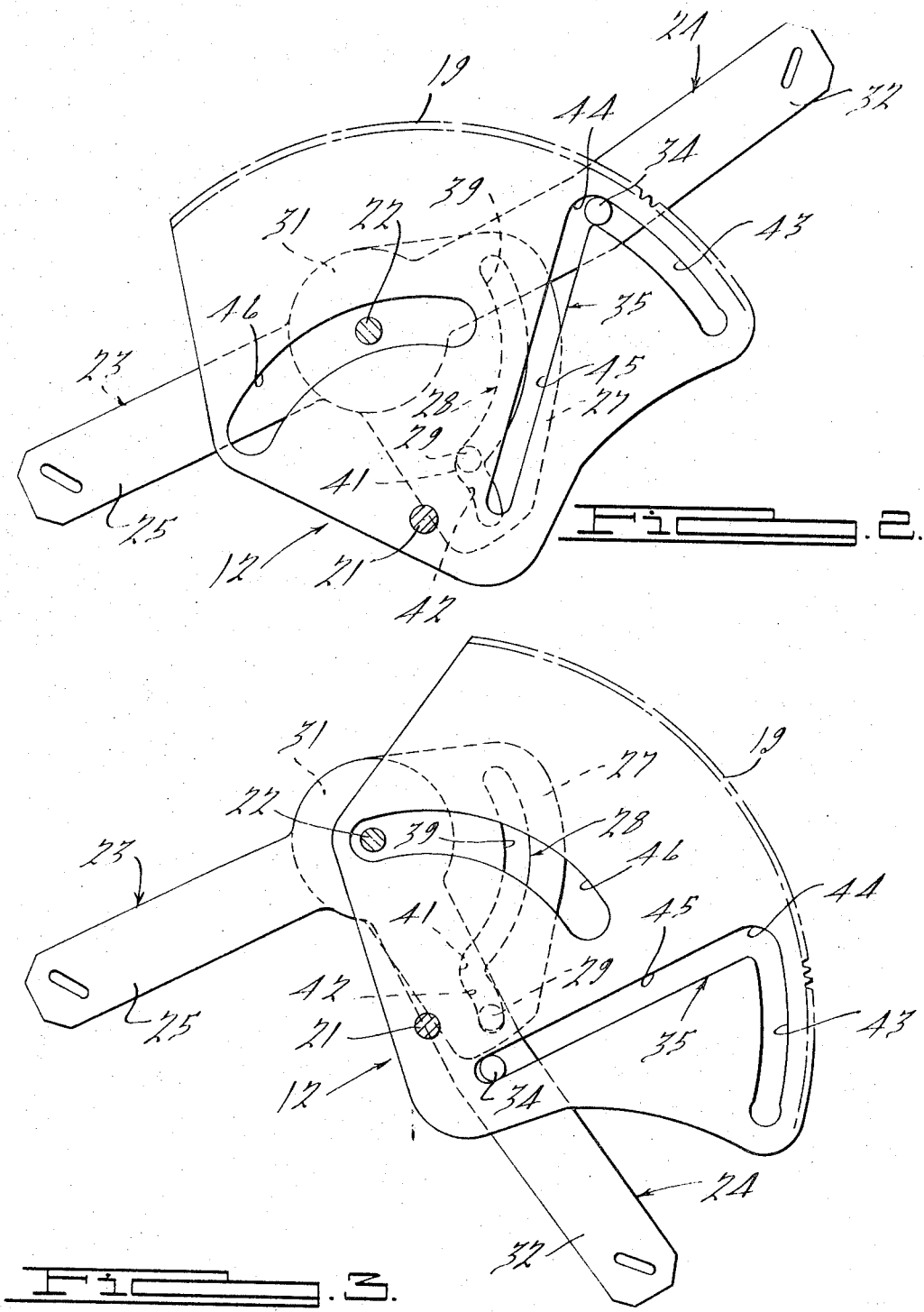

VEHICLE WINDOW REGULATOR MECHANISM

BACKGROUND OF THE INVENTION

For many years the front doors of automobile bodies made in the United States were equipped with a conventional window panel that could be vertically raised and lowered relative to a window opening and an auxiliary or ventilation panel forwardly of the main window panel. The ventilation panel was pivotable about a substantially vertical axis and could not be raised or lowered. With the advent of windshields having a greater rearward slope, the use of pivoted vent windows fell somewhat in disfavor. For one thing, it was difficult to hinge the sharply triangular piece of glass that had to be used. Also, the pivotal vent window structure required at least on the abutting edge of the main panel a fixed metal frame or sealing strip to close the gap between the two pieces of glass. This created a conflict with the desire to use frameless windows, particularly on the hardtop models. As a result, the pivoted vent window was eliminated from many models and the front door window became a large single piece of glass, with or without a circumscribing frame.

The elimination of pivoted vent windows raised some objections from potential customers. The pivoted vent window provided a system that could be adjusted to give a desirable exhaust flow of air from the vehicle interior that has not been duplicated by other systems on the vehicle body. As recognized in U.S. Pat. No. 1,770,747 issued July 15, 1930 to William D. Crowell, the area immediately to the rear of the vehicle windshield pillar is a low pressure area in the vehicle air slipstream. An opening in this area provides an efficient means for exhausting air from the vehicle interior.

The Crowell patent discloses a vertical division of the window panel into independently movable sections so that the forward section can be raised or lowered to provide the desired amount of exhaust opening. In the Crowell disclosure, each window panel section is operated by an independent window regulator mechanism and each panel section is guided between fixed guide bars including a fixed division bar between the two window panel sections.

It is an object of the present invention to provide a window vertically divided into a small ventilation section and a large visibility section. The small ventilation section is constructed and arranged to provide for movement from a closed to a fully opened position or any intermediate position therebetween relative to the visibility section. Or, if desired, the ventilation and visibility sections may be lowered sequentially into the vehicle window well to provide a full window opening. Selected movement of the ventilation section and large visibility section is obtained through a singly multi-arm window regulator mechanism.

SUMMARY OF THE INVENTION

This invention relates to a vehicle window regulator mechanism adapted to raise and lower a window panel in a vehicle body window opening. The window panel is vertically divided into substantially coplanar visibility and ventilation sections. The window regulator mechanism for raising and lowering the panel comprises a mounting plate and a gear sector pivotally mounted on a pivot shaft carried by the mounting plate. A first regulator arm is swingable intermediate its ends on a second pivot shaft journalled on the mounting plate. The first regulator arm at one end is coupled to the ventilation section and at its other end has a cam slot. A follower mounted on the gear sector projects into the cam slot. A second regulator arm is swingable at one end about the pivot shaft on which the first regulator arm is pivoted and is coupled at its other end to the visibility section. A follower carried on the second regulator arm is in contact with a second cam slot, this one being in the gear sector.

The respective followers and cam slots are programmed so that upon rotation of the gear sector in window opening direction the ventilation section is lowered to a predetermined position before the visibility section starts to open and upon rotation of the gear sector in window closing direction the visibility section reaches a fully raised position before the ventilation section starts to rise.

The window regulator mechanism includes a drive pinion means for driving the gear sector about its pivot axis, the drive pinion means being driven either by a manual handcrank or by electric motor means.

DESCRIPTION OF THE DRAWINGS

Other objects, advantages and features of the present invention will become more apparent as this description proceeds, reference being had to the accompanying drawings, wherein:

FIG. 1 is a perspective view of a vehicle window regulator mechanism as embodied in the present invention;

FIG. 2 is a semi-diagrammatic view of the vehicle window regulator mechanism with parts thereof in positions thereof corresponding to a lowered position of the ventilation section and a raised position of the visibility section of the window panel; and FIG. 3 is a view in part similar to FIG. 2 with the window regulator components with both support arms in the lowered position.

DETAILED DESCRIPTION OF THE INVENTION

Referring now to the drawings, there is illustrated a window panel, generally designated 11, coupled to a window regulator mechanism, generally designated 12. The window panel 11 is a two piece structure comprising a small ventilation window 13 movable in substantially coplanar relationship to a large main or visibility section 14. A guide track 15 is mounted on the edge of the visibility section 14 in which the ventilation section 13 is slidable. The visibility section 14 is guided in its raising or lowering movement by suitable guide devices and stabilizers which provide in and out as well as for and aft stability. The guide structure forms no part of the present invention and, accordingly, is not shown.

The window regulator mechanism 12 comprises, in part, a window regulator mounting plate 16 to which the rest of the regulator parts are attached. The mounting plate 16 is adapted to be mounted on a door panel (not shown) in any conventional manner.

The window regulator mechanism 12 is shown as a manual type having a crank handle 17 coupled to a drive pinion 18 for transmitting operating torque to a gear sector 19. It will be understood that a reversible electric motor could be substituted for the crank handle 17, as is well known in the art.

The gear sector 19 is pivotally mounted on a pivot shaft 21 carried at the lower end of the mounting plate 16. Intermediate its ends, the mounting plate 16 carries a second pivot shaft 22 which is journalled for rotation.

The pivot shaft 22 supports a first regulator arm 23 and a second regulator arm 24.

The first regulator arm 23 is pivoted intermediate its ends and has an elongated arm portion 25 adapted to be coupled at 26 to the small or ventilation section 13 of the window panel 11. The regulator arm 23 has an enlarged section or end portion 27 extending substantially at a right angle to the longitudinal axis of the elongated arm 25. The enlarged section 27 has a cam slot 28 therein which is adapted to coact with a follower 29 carried on the gear sector 19.

The first regulator arm 23 is freely swingable about the pivot shaft 22, its position being controlled only by the follower 29 and cam slot 28 relationship, as will be explained.

The second regulator arm 24 is coupled at its one end 31 to the pivot shaft 22 whereby movement of the arm 24 will result in rotation of the shaft. At its free end 32 the arm 24 is connected by a suitable connection device 33 to the lower edge of the visibility section 14 of the window panel 11. Movement of the second regulator arm 24 is controlled by a cam follower 34 mounted intermediate the ends of the arm 24 which coacts with a cam slot 35 in the gear sector 19.

The arm 24 and the weight of the window panel 14 are counterbalanced by a conventional counterbalance flat spiral or clock spring 36 which is connected at its inner end 37 to the shaft 22 and at its free end 38 to the regulator mounting plate 16.

The respective followers and cam slots are programmed so that upon rotation of the gear sector in window opening direction, i.e., in a clockwise direction as viewed in FIG. 1, the ventilation section 13 is first lowered to a predetermined position before the visibility section 14 starts to open or move downwardly. Upon rotation of the gear sector 19 in window closing direction, the visibility section 14 reaches a fully raised position before the ventilation section 13 starts to rise.

More specifically, the programming of the cam slot 28 in the regulator arm 23 comprises an elongated arcuate section 39, a transitional section 41 and an arcuate section 42 having a radius about the gear sector 19 pivot axis. The programming of the cam slot 35 in the gear sector 19 coacting with the follower 34 on the second regulator arm 24 comprises an arcuate section 43 having a radius about the gear sector pivot axis, a transitional section 44 and a straight inclined section 45.

OPERATION

The lowering of the window panel 11 from the fully raised position shown in FIG. 1 is a two phase operation. In FIG. 1, the window panel 11 is shown in fully raised position and, correspondingly, the arms 23 and 24 of the window regulator mechanism 12 extend in an upwardly inclined direction. From this starting position the window may be lowered by turning the crank handle 17 in a counterclockwise direction. The counterclockwise rotation of the pinion 18 drives the gear sector 19 in a clockwise direction about its pivot axis 21.

It should be explained that the pivot shaft 22 on which the window regulator arms 23 and 24 are carried passes through the gear sector, the latter being provided with a wide slot 46 to permit movement of the gear sector as it traverses the shaft 22.

As the gear sector 19 begins to turn in a clockwise direction, it causes relative movement between the cam follower 29 and the cam slot 28 as well as between the cam follower 34 and the cam slot 35. The relative movement between the cam follower 29 and the cam slot 28, especially in that phase of the movement in which the cam follower 29 is in the arcuate portion 39 of the cam slot 28 results in the regulator arm 23 being swung in a counterclockwise direction causing the ventilation section 13 to be lowered. No movement of the visibility section 14 occurs because the cam slot 35, which coacts with the follower 34, is in an idle position relative to the latter. That is, the arcuate portion 43 on the cam slot 35 has a radius equal to the circular movement about the pivot shaft 21 of the gear sector. As a result, the follower 34 moves within the arcuate portion 43 of the cam slot without causing any corresponding movement of the window regulator arm 24.

As the rotation of the gear sector 19 is continued in a clockwise direction, the downward movement of the ventilation section 13 continues and the visibility section 14 remains stationary until the transition sections of the cam slots 28 and 35 are reached. That is, the follower 29 moving in the arcuate portion 39 of the cam slot 28 arrives at the corner or transition section 41 of the cam slot 28 and the follower 34 carried on the regulator arm 24 arrives at the transition section 44 of the cam slot 35. These transition sections may be considered the start of the second phase of operation. In the second phase, the follower 29 begins to move in the arcuate section 42 of the cam slot 28. Simultaneously, the follower 34 on the arm 24 comes under the influence of the inclined straight section 45 of the cam slot 35.

Reference is made to FIG. 2 in which the followers 29 and 34 are shown at the transition sections 41 and 44 of the respective cam slots 28 and 35.

The window regulator arm 23 is at its lowermost position and further relative movement between the follower 29 and the arcuate portion 42 of the cam slot 28 has no further effect on the arm 23 since the follower merely idles in the arcuate slot 42. The arcuate section 42 has a radius about the gear sector pivot axis and is thus unable to influence the follower 29 which is carried on the gear sector 19. While the follower 29 is idling, however, it is able to hold the arm 23 and therefore the ventilation section 13 in a down position.

As to the visibility section 14, the arm 24 on which it is supported is now forced downwardly through the coaction between the follower 34 and the walls of the straight section 45 of the cam slot 35. This movement continues until the cam follower 34 is at the end of the slot 45.

Reference is made to FIG. 3 illustrating the relationship of the cam followers 29 and 34 to the slots 29 and 35 in a fully down position of both the visibility and ventilation sections of the window panel 14.

As arm 24 moves downwardly it causes the shaft 22 to turn winding up the counterbalance spring 36.

To raise the window panel 11, the crank handle 17 must be rotated in a clockwise direction to drive the gear sector 19 in a counterclockwise direction. The follower 34 travelling in the straight slot section 45 causes the arm 24 to be raised raising the visibility section 14 of the window panel 11. The cam follower 29 idles in the arcuate portion 42 of the cam slot 28 and there is no immediate response to the rotation of the gear sector 19 by the window regulator arm 23. Upon the transition sections 41 and 44 of the cam slots 28 and 35, respectively, being reached, the visibility section 14 will be in a fully raised position and the ventilation section 13 will be in condition to be raised. Continued rotation of the gear sector in the counterclockwise direction places the cam follower under the influence of the arcuate portion 39 of the cam slot 28 and results in the arm 23 being swung in an upward direction to raise the ventilation section 13 of the window panel 11. As this is occurring, the cam follower 35 idles in the arcuate portion 43 of the cam slot 35 and therefore exerts no influence on the window regulator arm 24.

It will be readily apparent that the ventilation section 13 may be lowered to any desired position without causing movement of the visibility section 14 of the window panel 11. For example, it only would be necessary to turn the crank 17 in a counterclockwise direction a distance sufficient to rotate the gear sector 19 to the FIG. 2 position of the latter at which the ventilation section 13 is dropped below the visibility panel section 14. Then by reversing direction or rotation of the crank 17, the ventilation panel 13 may be raised back to a fully closed position or interrupted and halted at any position inbetween. The visibility section 14 cannot be lowered without first lowering the ventilation section 13 to the bottom of its travel. The visibility section 14, however, then may be lowered any desired degree from a fully raised to a fully lowered position and then its direction of movement reversed at will.

The invention disclosure will have many modifications which will be apparent to those skilled in the art in view of the teachings of this specification. It is intended that all modifications which fall within the true spirit and scope of this invention be included within the scope of the appended claims.

We claim:

1. A vehicle window regulator mechanism adapted to raise and lower a window panel in a vehicle body window opening, the window panel being vertically divided into substantially coplanar visibility and ventilation sections, the window regulator mechanism being characterized in that it comprises:

a mounting plate, a gear sector pivotally mounted on a first pivot shaft carried by the mounting plate, a first regulator arm swingable intermediate its ends on a second pivot shaft journalled in the mounting plate, the first regulator arm at one end being coupled to the ventilation section and at its other end having a cam slot, a follower mounted on the gear sector projecting into the cam slot, a second regulator arm swingable at one end about the pivot shaft on which the first regulator arm is pivoted and coupled at its other end to the visibility section, a follower carried on the second regulator arm in contact with a cam slot in the gear sector, the respective followers and cam slots being programmed so that upon rotation of the gear sector in window opening direction the ventilation section is driven to a fully lowered position before the visibility section starts to lower and upon rotation of the gear sector in window closing direction the visibility section is driven to a fully raised position before the ventilation section starts to rise, the cam slot in the first regulator arm having an elongated arcuate section, a transitional section and a terminal arcuate section having a radius about the gear sector pivot axis, whereby, upon the gear sector being rotated in ventilation section lowering direction, the cam follower on the gear sector moves relative to the elongated arcuate section to the transitional section as the ventilation section is cammed to its fully lowered position, and, after passing through the transitional section, the cam follower idles in the terminal arcuate section and holds the ventilation section at its lowered position, and drive pinion means for rotating the gear sector about its pivot axis.

2. A vehicle window regulator mechanism according to claim 1, in which:

the cam slot in the gear sector coacting with the follower in the second regulator arm has an arcuate section having a radius about the gear sector pivot axis, a transitional section and a straight inclined section, whereby, upon the gear sector being rotated in visibility section lowering direction, the cam follower carried by the second regulator arm moves in the arcuate section of the cam slot in the gear sector without transmitting movement to the visibility section until the transitional section is reached, and, as the sector rotates further, the cam follower moves from the transitional section and travels in the straight section of the cam slot in the gear sector allowing the visibility section to lower.

3. A vehicle window regulator mechanism according to claim 2, in which:

the second regulator arm is coupled to the shaft to turn with the latter as the arm is raised and lowered, and a counterbalance spring means is also coupled to the shaft to counterbalance the weight of the visibility section of the window panel.

4. A vehicle window regulator mechanism adapted to raise and lower a window panel in a vehicle body window opening, the window panel being vertically divided into substantially coplanar visibility and ventilation sections, the window regulator mechanism being characterized in that it comprises:

a mounting plate, a gear sector pivotally mounted on a first pivot shaft carried by the mounting plate, a first regulator arm swingable intermediate its ends on a second pivot shaft journalled in the mounting plate, the first regulator arm at one end being coupled to the ventilation section and at its other end having a cam slot, a follower mounted on the gear sector projecting into the cam slot, a second regulator arm swingable at one end about the pivot shaft on which the first regulator arm is pivoted and coupled at its other end to the visibility section, a follower carried on the second regulator arm in contact with a cam slot in the gear sector, the respective followers and cam slots being programmed so that upon rotation of the gear sector in window opening direction the ventilation section is driven to a fully lowered position before the visibility section starts to lower and upon rotation of the gear sector in window closing direction the visibility section is driven to a fully raised position before the ventilation section starts to rise, the cam slot in the first regulator arm having an elongated arcuate section, a transitional section and a terminal arcuate section having a radius about the gear sector pivot axis, the cam slot in the gear sector coacting with the follower in the second regulator arm having an arcuate section having a radius about the gear sector pivot axis, a transitional section and an inclined straight section;

whereby, upon the gear sector being rotated in window panel lowering direction, the cam follower on the gear sector moves in the elongated arcuate section of the slot in the first regulator arm to the transitional section as the ventilation section is cammed to its fully lowered position, and the cam follower carried by the second regulator arm moves in the arcuate section to the transitional section of the slot without transmitting movement to the ventilation section of the window panel, and, further, upon the gear sector being rotated in continuous window panel lowering direction, the cam follower on the gear sector moves from the transitional section of the slot in the first regulator arm through the terminal arcuate section of the latter without causing further lowering movement of the ventilation section, and simultaneously the cam follower carried by the second regulator arm moves from the transitional section of the slot in the gear sector through the inclined straight section of the latter to cause the visibility section to drop to a fully lowered position, and drive pinion means for rotating the gear sector about its pivot axis.

5. A vehicle window regulator mechanism according to Claim 4, in which:

the second regulator arm is coupled to the shaft to turn the latter as the arm is raised and lowered, and a counterbalance spring means is also coupled to the shaft to counterbalance the weight of the visibility section of the window panel.

* * * * *